(12) United States Patent
Wells et al.

(10) Patent No.: US 9,311,245 B2
(45) Date of Patent: Apr. 12, 2016

(54) DYNAMIC CACHE SHARING BASED ON POWER STATE

(75) Inventors: Ryan D. Wells, Folsom, CA (US); Michael J. Muchnick, Fair Oaks, CA (US); Chinnakrishnan S. Ballapuram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1721 days.

(21) Appl. No.: 12/583,036

(22) Filed: Aug. 13, 2009

(65) Prior Publication Data

US 2011/0040940 A1 Feb. 17, 2011

(51) Int. Cl.
*G06F 12/08* (2006.01)

(52) U.S. Cl.
CPC .......... *G06F 12/084* (2013.01); *G06F 12/0864* (2013.01); *G06F 2212/1028* (2013.01); *G06F 2212/604* (2013.01); *G06F 2212/6046* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 5,875,464 A * | 2/1999 | Kirk | 711/129 |
| 6,493,800 B1 * | 12/2002 | Blumrich | 711/129 |
| 6,513,104 B1 | 1/2003 | Gaskins | |
| 6,516,387 B1 | 2/2003 | Auracher | |
| 6,553,473 B1 | 4/2003 | Gaskins et al. | |
| 6,611,387 B1 | 8/2003 | Goldstein et al. | |
| 6,801,208 B2 * | 10/2004 | Keshava et al. | 345/557 |
| 7,023,445 B1 * | 4/2006 | Sell | 345/557 |
| 7,139,135 B2 | 11/2006 | Goldstein et al. | |
| 7,464,212 B2 | 12/2008 | Narad | |
| 7,890,675 B2 * | 2/2011 | Aranguren et al. | 710/56 |
| 8,412,885 B2 * | 4/2013 | Cheng | G06F 12/0895 711/128 |
| 2002/0184445 A1 * | 12/2002 | Cherabuddi | 711/130 |
| 2003/0172234 A1 * | 9/2003 | Soltis, Jr. | 711/122 |
| 2003/0177313 A1 * | 9/2003 | Iyer et al. | 711/129 |
| 2006/0004963 A1 * | 1/2006 | Mattina et al. | 711/130 |
| 2006/0143390 A1 * | 6/2006 | Kottapalli | 711/130 |
| 2007/0043965 A1 * | 2/2007 | Mandelblat et al. | 713/324 |
| 2007/0101064 A1 | 5/2007 | Piry et al. | |
| 2007/0124538 A1 * | 5/2007 | Abadeer et al. | 711/128 |
| 2007/0143546 A1 * | 6/2007 | Narad | 711/130 |
| 2008/0010473 A1 * | 1/2008 | Harris | 713/300 |
| 2008/0250415 A1 * | 10/2008 | Illikkal et al. | 718/103 |
| 2010/0250856 A1 * | 9/2010 | Owen et al. | 711/128 |
| 2010/0287339 A1 * | 11/2010 | Olszewski et al. | 711/128 |
| 2011/0283124 A1 * | 11/2011 | Branover et al. | 713/323 |

OTHER PUBLICATIONS

A. Bardine et al. "Improving Power Efficiency of D-NUCA Caches." Sep. 2007. ACM. ACM SIGARCH Computer Architecture News. vol. 35. pp. 53-58.*

(Continued)

*Primary Examiner* — Nathan Sadler
(74) *Attorney, Agent, or Firm* — Trop, Pruner & Hu, P.C.

(57) ABSTRACT

In one embodiment, the present invention includes a cache, compute engines connected to the cache, and a way mask disposed between the cache and the compute engines. This way mask may be partitioned into ways. Some of the ways may be dedicated to only one of the compute engines and other ways can be shared among more than one of the compute engines. Other embodiments are described and claimed.

17 Claims, 2 Drawing Sheets

(56) References Cited

OTHER PUBLICATIONS

U.S. Patent and Trademark Office, Office Action mailed Aug. 29, 2012 with Reply filed on Nov. 27, 2012 in U.S. Appl. No. 12/590,651.

* cited by examiner

DYNAMIC CACHE SHARING BASED ON POWER STATE

BACKGROUND OF THE INVENTION

1. Field of the Invention

The present invention relates to a field of processor design, and, more specifically; to an apparatus for and a method of sharing cache resources between processors.

2. Discussion of Related Art

Computing power of processors is increasing much faster than bandwidth available from main memory. As a result, increasingly large and complex caches need to be designed to support and feed compute-intensive processors.

However, allocating more transistors to cache results in the cache occupying a larger portion of die area. Furthermore, available cache resources, no matter how large, are increasingly difficult to allocate.

In particular, partitioning of the cache resources between different compute engines to obtain optimal performance for different workloads becomes difficult to achieve effectively and efficiently.

DETAILED DESCRIPTION OF THE PRESENT INVENTION

In the following description, numerous details, examples, and embodiments are set forth to provide a thorough understanding of the present invention. However, it will become clear and apparent to one of ordinary skill in the art that the invention is not limited to the details, examples, and embodiments set forth and that the invention may be practiced without some of the particular details, examples, and embodiments that are described. In other instances, one of ordinary skill in the art will further realize that certain details, examples, and embodiments that may be well-known have not been specifically described so as to avoid obscuring the present invention.

An apparatus for and a method of sharing cache resources are disclosed in the present invention. Utilization of a cache can result in a significantly improvement in performance of a compute engine. A large chip may include a level 1 (L1) cache and a level 2 (L2) cache. In general, a last level cache (LLC) is a cache that is located farthest from a compute engine and nearest to main memory. Intelligent sharing of the cache, such as the LLC, between multiple compute engines increases overall performance of a system for a given workload.

Various embodiments of the apparatus for sharing cache resources according to the present invention will be described first. The present invention envisions an apparatus for dynamically allocating cache resources among compute engines. Allocation of cache resources can be done among multiple compute engines. Allocation of cache resources can also be performed among different types of compute engines.

Figure 1:
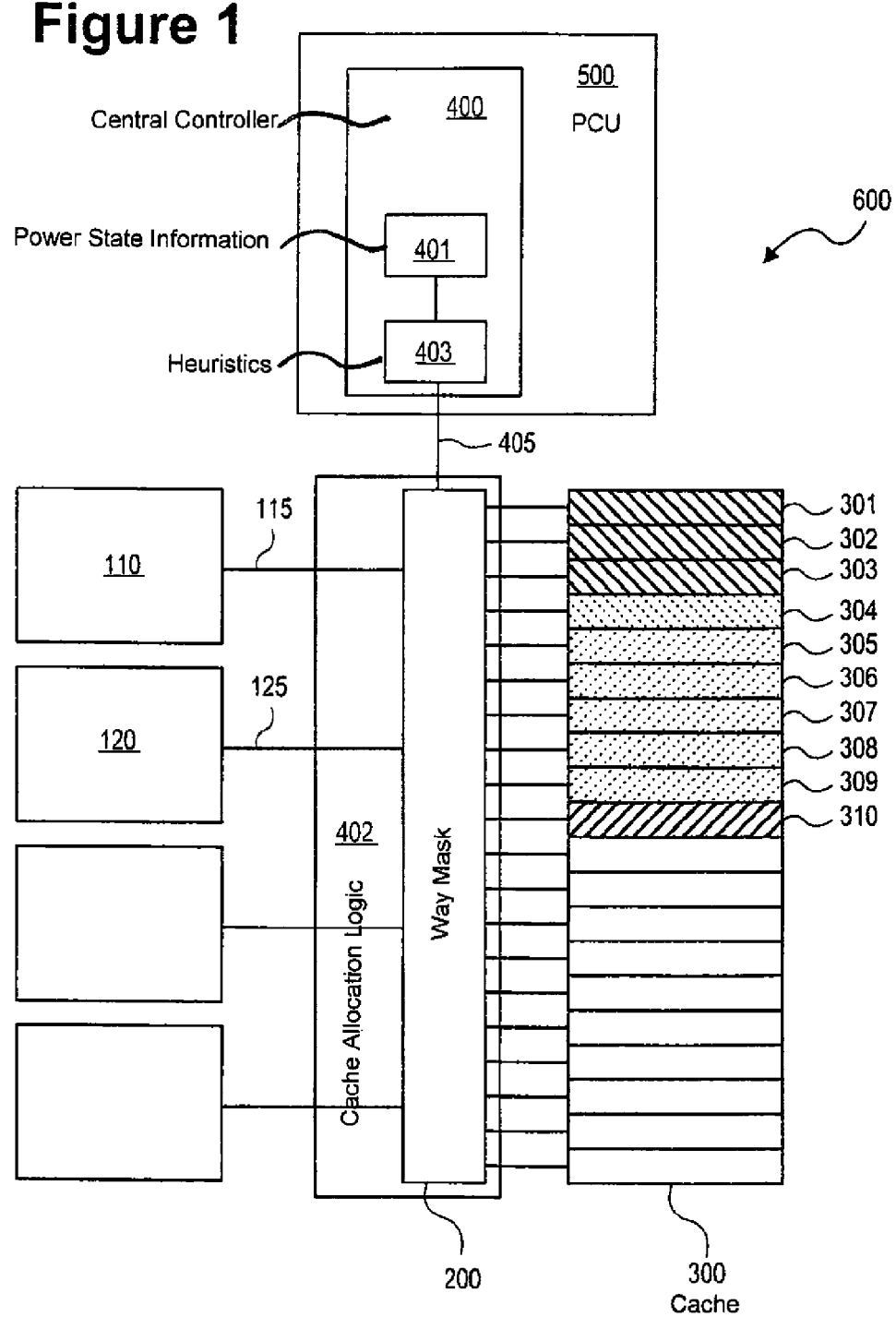
FIG. 1 shows way mask and shared cache according to an embodiment of the present invention.

As shown in an embodiment of the present invention in FIG. 1, the compute engines 110, 120 are connected to a cache 300. The compute engines 110, 120 and the cache 300 form part of a system 600.

The compute engines 110, 120 may be located in a single die, in a single package, in a single board, or in a single sub-system (not shown). In one case, the compute engines include a central processing unit (CPU) 110 and a graphics processing unit (GPU) 120. In another case, the compute engines include multiple cores. In still another case, the compute engines include system on a chip (SOC). In yet another case, the compute engines are embedded.

The data array of a highly to fully set-associative cache can be organized into ways. The cache 300 is partitioned into ways 301, 302, . . . , 309, 310 by a way mask 200. The way mask 200 may be included in cache allocation logic 402.

In one case, the way mask 200 is connected with a central controller 400. The central controller 400 may be located in a power control unit (PCU) 500 of the system 600. Control for the way mask 200 can be on-chip, on-board, or remote. The control can be performed by hardware, software, firmware, or a combination of the above. The way mask 200 can be programmable using firmware.

The cache allocation logic 402 evaluates the cache requests 115, 125 from the respective compute engines 110, 120 and determines which ways 301, 302, . . . , 309, 310 in the cache 300 to access for each of the compute engines 115, 125. The cache allocation logic 402 is usually not located in the PCU 500. In one case, the cache allocation logic 402 is located between the compute engines 110, 120 and the way mask 200. In another case, the way mask 200 is included in the cache allocation logic 402.

Cache allocation heuristics 403 may be located in the PCU 500. Allocation of cache resources may be based on a parameter or metric or a combination of parameters and metrics. A parameter refers to a physical attribute or property that may change in value. A metric refers to a mathematical function that may be measured or calculated. The metric may be based on one or more parameters. The metric may include an algorithm or equation.

In one case, the parameter or metric includes power state 401 information. The cache allocation heuristics 403 may use power state 401 information as input and then provide way mask updates 405 as output.

The parameter or metric of the power state 401 information can be combined with other parameters or metrics to improve decision for allocation of cache resources. The other parameters or metrics can include instructions per cycle (IPC), cache misses per instruction, and memory boundness of the workload.

The size of a cache 300 allocated to a computing engine can be changed linearly by using selective ways. For smaller cache sizes, set associativity can significantly impact cache performance. However, for larger cache sizes, capacity plays a more important role than set associativity.

Power savings are optimized by choosing a size for the cache 300 that is closest to a size demanded by an application. Optimizing the size of the cache 300 will also reduce sub-threshold leakage energy dissipation which is proportional to size of the cache 300 in CMOS circuits.

Compared with selective sets, selective ways is relatively simple to design since only a way mask 200 and corresponding cache allocation logic 402 are required. In one case, the way mask 200 is included in the cache allocation logic 402.

The way mask 200 applies to cache fills, but not cache lookups. When allocation changes and a compute engine no longer has access to certain ways, data may no longer be allocated in those ways, but any existing data in those ways may still be looked up.

Each way in the cache 300 may include a number of sub-arrays. If desired by circuit implementation, the way mask 200 allows all of the subarrays in a particular way to be enabled or disabled together. Selective ways does not alter set mapping of cache blocks and so avoids a need for flushing blocks in the enabled subarrays upon resizing.

The present invention also envisions a method of dynamically allocating cache resources among compute engines. Allocation of cache resources can be done among multiple compute engines. Allocation of cache resources can also be performed among different types of compute engines.

Figure 2:
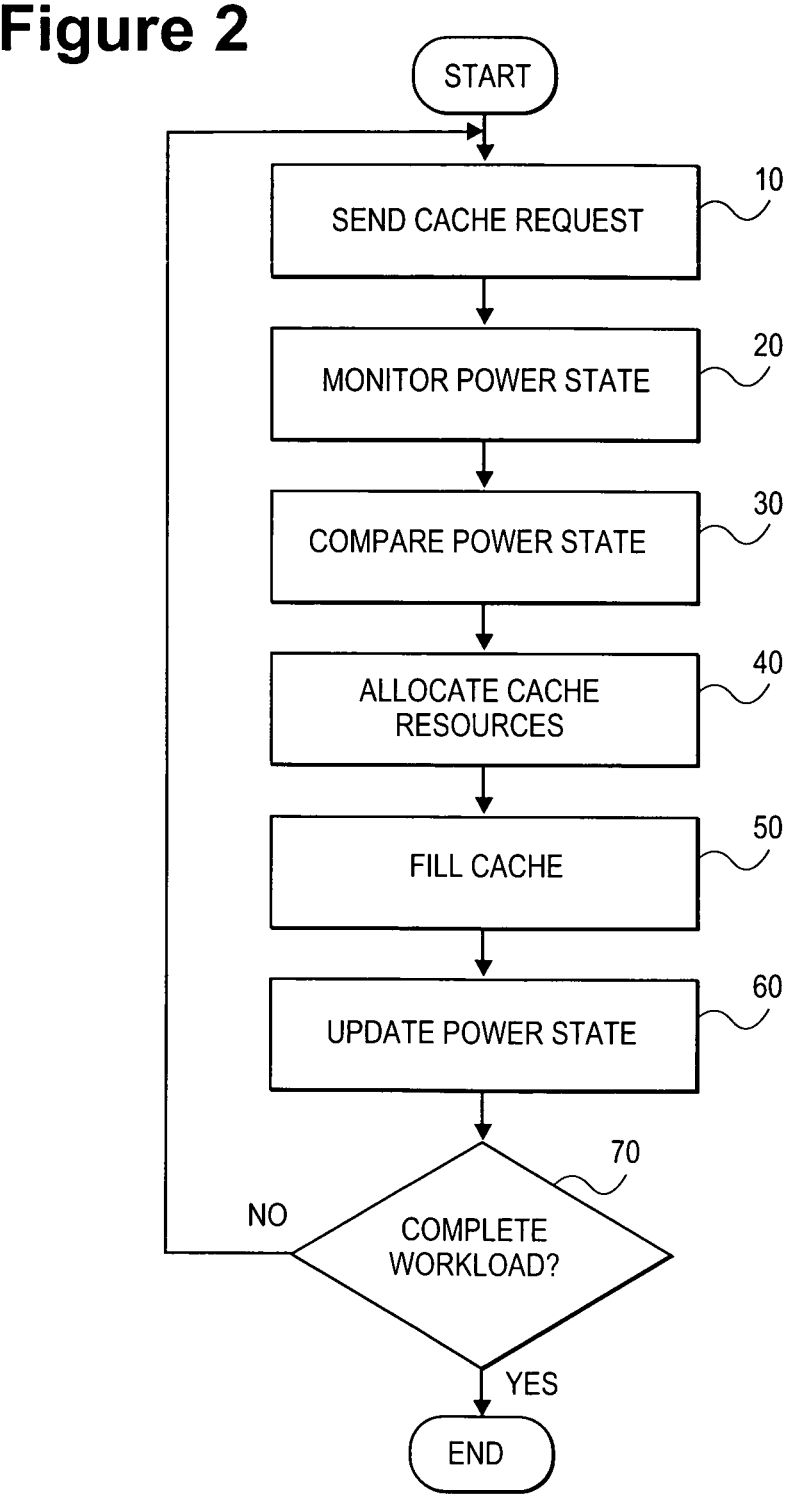
FIG. 2 shows flowchart of cache allocation based on power state according to an embodiment of the present invention.

In an embodiment of the present invention as shown in block 10 in FIG. 2, a cache request may be sent by one or more compute engines.

In one case as shown in FIG. 1, the CPU 110 sends a cache request 115. The GPU 120 may independently send a cache request 125. The cache allocation logic 402 evaluates the cache requests 115, 125 from the respective compute engines 110, 120 and determines which ways 301, 302, . . . , 309, 310 in the cache 300 to access for each of the compute engines 115, 125. The cache allocation logic 402 is usually not located in the PCU 500. In one case, the cache allocation logic 402 is located between the compute engines 110, 120 and the way mask 200. In another case, the way mask 200 is included in the cache allocation logic 402.

Cache allocation heuristics 403 may be located in the PCU 500. Allocation of cache resources may be based on a parameter or metric or a combination of parameters or metrics. A parameter refers to a physical attribute or property that may change in value. A metric refers to a mathematical function that may be measured or calculated. The metric may be based on one or more parameters. The metric may include an algorithm or equation.

In one case, the parameter or metric includes power state 401 information. According to an embodiment of the present invention as shown in block 20 of FIG. 2, the power state 401 information for multiple, or all, agents in a chip, package, or system are monitored.

In one case, the monitoring is continuous and uninterrupted. In another case, the monitoring is continual and repeated. The monitoring may include periodic sampling at regular intervals. The intervals may be measured in duration of time. Alternatively, the intervals may be measured in number of cache accesses.

In one case, the compute engines are monitored concurrently. In another case, the compute engines are monitored sequentially. In still another case, the compute engines are monitored randomly. In yet another case, the compute engines are monitored based on an arbitrary predetermined schedule.

According to an embodiment of the present invention as shown in block 30 of FIG. 2, the power state 401 is compared. In one case, the power state 401 is compared among different compute engines. In another case, the power state 401 is compared with a setpoint value, a target value, or a range in a specification.

As shown in FIG. 1, the cache allocation heuristics 403 may use power state 401 information as input and then provide way mask updates 405 as output. In particular, the way mask 200 determines how the ways 301, 302, . . . , 309, 310 of the cache 300 are filled under different workloads by various compute engines, such as the CPU 110 and the GPU 120.

According to an embodiment of the present invention as shown in block 40 of FIG. 2, the way mask 200 is adjusted or controlled to allocate cache resources. In one case, the cache allocation is always adjusted dynamically. In another case, the cache allocation is mostly adjusted dynamically. In still another case, the cache allocation is sometimes adjusted statically. In yet another case, the cache allocation is mostly adjusted statically.

In one case, the cache allocation is adjusted based on probability and statistics. In another case, the cache allocation is adjusted based on fuzzy logic. In still another case, the cache allocation is adjusted based on real-time feedback. In still another case, the cache allocation is adjusted based on artificial intelligence (AI) learning.

Adjustment or control of the way mask 200 can be on-chip, on-board, or remote. The adjustment or control of the way mask 200 can be performed by hardware, software, firmware, or a combination of the above.

The parameter or metric of the power state 401 information for a compute engine includes P-states (frequencies) and C-states (sleep states). The P-states reduce power consumption of the compute engine by altering efficiency of execution. The C-states are used whenever the compute engine has no work or almost no work to do. In general, lower power can be achieved in exchange for accepting or tolerating lower performance or longer wake latency.

In an embodiment of the present invention as shown in block 30 of FIG. 2, the P-states for the various compute engines are compared.

Next, hardware, software, firmware, or a combination of the above, provides or sends way mask updates 405 to the way mask 200 to partition some, or all, of the ways in the cache 300.

In one case, the way mask updates 405 indicate whether to adjust or control the way mask 200. In another case, the way mask updates 405 indicate how to adjust or control the way mask 200. In still another case, the way mask updates 405 indicate when to adjust or control the way mask 200.

Then, the way mask 200 enables certain ways in the cache 300 and controls which compute engine can use them. As an example, the cache resources can be shifted as needed between the CPU 110 and the GPU 120 based on their respective workloads. In one case, the CPU 110 would use most of the cache during a CPU-intensive workload with minimal graphics activity, such as a Standard Performance Evaluation Corporation (SPEC) benchmark. In another case, the GPU 120 would get most of the cache resources during a Gfx-heavy workload, such as a 3D game.

The allocation of cache resources need not be complete. A way in the cache 300 can be turned off (such that no compute engine can use it) such as to reduce power consumption. In such a situation, some ways in the cache 300 are not used.

The allocation of cache resources need not be symmetrical. Allocation of a way in the cache 300 can be exclusive (such that only one compute engine can use the way) or non-exclusive (such that multiple compute engines can share the way).

As shown for an illustrative purpose in FIG. 1, the CPU 110 has access to 10 ways in a cache 300 while GPU 120 only has access to 7 of the 10 ways. In one particular implementation, the dedicated ways 301, 302, 303, are only used by the CPU 110 while the dedicated way 310 is only used by the GPU 120. The shared ways 304, 305, 306, 307, 308, 309 can be used by either the CPU 110 or the GPU 120. However, the shared ways 304, 305 are usually used by the CPU 110 while the shared ways 306, 307, 308, 309 are usually used by the GPU 120.

Other implementations of the ways 301, 302, . . . , 309, 310 may be chosen and used. A library may be maintained of various implementations of the ways 301, 302, . . . , 309, 310. A lookup table may be maintained of the various implementations of the ways 301, 302, . . . , 309, 310.

As shown in an embodiment of the present invention in block 40 of FIG. 2, cache resources are allocated for the compute engine that requires more cache resources. In one embodiment, frequency is used to predict cache demand and cache resources are shifted toward the compute engine that is running closest to its maximum frequency. In another embodiment, cache resources are shifted toward the compute engine that spends the least amount of time in a sleep state.

According to an embodiment of the present invention as shown in block 50 of FIG. 2, the cache 300 is filled. The filling of the cache 300 may be based on the allocation of cache resources.

Then, according to an embodiment of the present invention as shown in block 60 of FIG. 2, the power state 401 is updated.

In an embodiment of the present invention as shown in block 70 of FIG. 2, dynamic cache allocation continues until completion of the workload on the compute engines connected to the cache 300.

The mechanism described in the present invention is self-correcting in that if an incorrect or sub-optimal decision to remove cache resources from a particular compute engine is made, it will degrade performance on that engine, a parameter or metric such as IPC will drop, utilization will rise, and the frequency will be raised, giving feedback to the cache allocation heuristics 403 to return the cache resources.

Decisions can also be made on other cache-related parameters, such as shrinking a cache 300 to reduce power consumption when the cache allocation heuristics 403 in FIG. 1 suggest that a workload of a compute engine is not currently demanding a high level of performance or that it does not require most or all of the available cache resources.

Allocation decisions can also be made in a similar fashion regarding other shared resources besides cache resources. Other shared (non-cache) resources include other memory subsystem resources, such as memory bandwidth and cooling capacity. For example, memory peripheral hub and memory controller queues for different compute engines may also be allocated dynamically based on feedback from the PCU 500.

Allocation of the shared (non-cache) resources may be based on a parameter or metric or a combination of parameters or metrics. A parameter refers to a physical attribute or property that may change in value. A metric refers to a mathematical function that may be measured or calculated. The metric may be based on one or more parameters. The metric may include an algorithm or equation. In one case, the parameter or metric includes power state 401 information.

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

We claim:

1. A system comprising:
   a cache;
   compute engines connected to said cache;
   cache allocation logic associated with a way mask disposed between said cache and said compute engines, said way mask partitioned into ways, wherein some ways are dedicated to only one of said compute engines and other ways are shared among more than one of said compute engines;
   a power control unit to monitor a power state of said compute engines and to update said way mask based on said power state of said compute engines.

2. The system of claim 1 further comprising:
   a central controller connected to said way mask.

3. The system of claim 2 wherein said central controller is disposed in said power control unit.

4. The system of claim 3 wherein said central controller is to monitor said power state of said compute engines, compare said power state, and allocate said cache.

5. The system of claim 4 wherein said way mask is partitioned into ways depending on said power state of said compute engines.

6. The system of claim 1 wherein said compute engines comprise a central processing unit.

7. The system of claim 1 wherein said compute engines comprise a graphics processing unit.

8. The system of claim 1, wherein said system is to dynamically allocate said cache using a prediction of cache demand.

9. The system of claim 8, wherein said prediction is based on a frequency of at least one of said compute engines.

10. The system of claim 1, wherein said power state is monitored based on information regarding a P-state and a C-state from said compute engines.

11. An apparatus comprising:
    a single die including a central processing unit (CPU) and a graphics processing unit (GPU), the single die further including a shared cache memory coupled to the CPU and the GPU, cache allocation logic associated with a way mask disposed between the shared cache memory and the CPU and the GPU, the way mask partitioned into ways, wherein some ways are dedicated to only one of the CPU and the GPU and other ways are shared among more than one of the CPU and the GPU, and a power control unit to monitor a power state of the CPU and the GPU and to update the way mask based on the power state of the CPU and the GPU.

12. The apparatus of claim 11, wherein the apparatus is to dynamically allocate the cache using a prediction of cache demand.

13. The apparatus of claim 12, wherein the prediction is based on a frequency of the CPU.

14. The apparatus of claim 11, wherein the power state is monitored based on information regarding a P-state and a C-state from the CPU.

15. The apparatus of claim 11, wherein the cache allocation logic is to adjust a cache allocation based on fuzzy logic.

16. The apparatus of claim 11, wherein the cache allocation logic is to adjust a cache allocation based on artificial intelligence learning.

17. A system comprising:
    a single die including a central processing unit (CPU) and a graphics processing unit (GPU), the single die further including a shared cache memory, compute engines connected to the shared cache memory, cache allocation logic associated with a way mask disposed between the shared cache memory and the compute engines, the way mask partitioned into ways, wherein some ways are dedicated to only one of the compute engines and other ways are shared among more than one of the compute engines, and a power control unit to monitor a power state of the compute engines and to update the way mask based on the power state of the compute engines, wherein the system is to send a cache request, monitor the power state, compare the power state to a first value, allocate the shared cache memory, fill the shared cache memory, update the power state, respectively, iteratively until a workload is completed.

* * * * *